(12) United States Patent
Gustafson

(10) Patent No.: US 10,934,147 B2
(45) Date of Patent: Mar. 2, 2021

(54) LIFTING DEVICE

(71) Applicant: John E Gustafson, Fall Creek, WI (US)

(72) Inventor: John E Gustafson, Fall Creek, WI (US)

( * ) Notice: Subject to any disclaimer, the term of this patent is extended or adjusted under 35 U.S.C. 154(b) by 0 days.

(21) Appl. No.: 16/160,256

(22) Filed: Oct. 15, 2018

(65) Prior Publication Data

US 2020/0115207 A1    Apr. 16, 2020

(51) Int. Cl.
| | |
|---|---|
| *E02F 3/36* | (2006.01) |
| *A01B 59/06* | (2006.01) |
| *A01B 59/043* | (2006.01) |
| *B66F 9/065* | (2006.01) |
| *B66F 9/24* | (2006.01) |

(52) U.S. Cl.
CPC ............ *B66F 9/065* (2013.01); *A01B 59/043* (2013.01); *A01B 59/062* (2013.01); *B66F 9/24* (2013.01); *E02F 3/3604* (2013.01)

(58) Field of Classification Search
CPC ....... E02F 3/3604; E02F 3/964; E02F 3/3622; E02F 3/3618; A01B 59/062; A01B 59/043; A01B 59/066; B60D 1/465; B60D 1/141
USPC ............ 414/723; 37/468, 403; 172/439, 272
See application file for complete search history.

(56) References Cited

U.S. PATENT DOCUMENTS

| | | | | |
|---|---|---|---|---|
| 2,795,178 A | * | 6/1957 | Silver | A01B 59/067 |
| | | | | 172/272 |
| 4,232,878 A | * | 11/1980 | Moore, Jr. | A01B 59/043 |
| | | | | 172/449 |
| 4,509,768 A | * | 4/1985 | Haug | A01B 59/062 |
| | | | | 172/272 |
| 2007/0098538 A1 | * | 5/2007 | Zettel | A01B 59/064 |
| | | | | 414/723 |
| 2007/0108731 A1 | * | 5/2007 | McBroom | B60D 1/36 |
| | | | | 280/477 |

(Continued)

FOREIGN PATENT DOCUMENTS

| | | | |
|---|---|---|---|
| DE | 1124756 | * | 12/1960 |
| DE | 102015103925 | * | 3/2015 |
| EP | 2932819 | * | 12/2017 |

OTHER PUBLICATIONS

Design of a Three-Point Hitch (Year: 2018).*
Design of a Three Point Hitch; Svante Johansson, pp. 7, 8 and 52 (Year: 2008).*

*Primary Examiner* — Lee D Wilson
*Assistant Examiner* — Mahdi H Nejad
(74) *Attorney, Agent, or Firm* — Sherrill Law Offices, PLLC

(57) ABSTRACT

A lifting device for platforms carrying a load is disclosed. A winch or piston is engaged with two vertical arms connected to two horizontal arms configured for attaching to a load carrying assembly such that exerting an upward force on the two vertical arms causes the horizontal arms to pivot upward to lift the load carrying assembly which enables transporting the platform and the load on it to another location. The lifting device is configured to quickly attach to and detach from the load carrying platform and for maintaining a level position during transportation. The horizontal arms are configured for retracting and extending which enables the tilting of the load carrying assembly backward or forward as needed for improved transportation stability and load discharge.

18 Claims, 22 Drawing Sheets

(56) References Cited

U.S. PATENT DOCUMENTS

| | | | | |
|---|---|---|---|---|
| 2012/0261899 A1* | 10/2012 | Ockunzzi | ............... | B60D 1/075 |
| | | | | 280/416.1 |
| 2015/0289436 A1* | 10/2015 | Singh | ................... | A01B 63/112 |
| | | | | 172/7 |
| 2017/0290258 A1* | 10/2017 | Mollick | ............... | A01B 59/002 |
| 2018/0135272 A1* | 5/2018 | Gonzalez | .............. | E02F 3/3604 |
| 2018/0211450 A1* | 7/2018 | Gresch | ................... | G07C 5/008 |
| 2018/0332760 A1* | 11/2018 | Gresch | ................. | A01B 63/111 |

\* cited by examiner

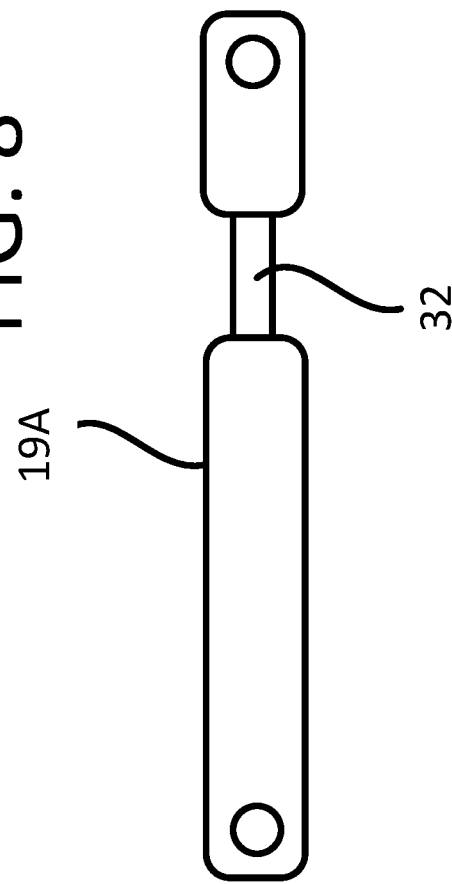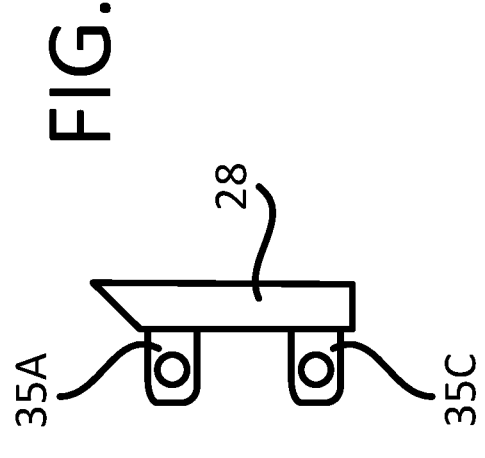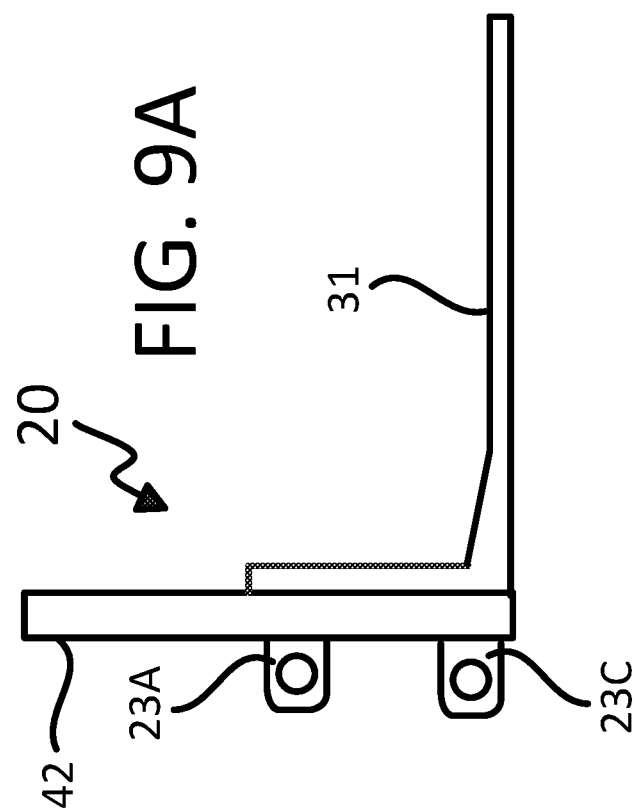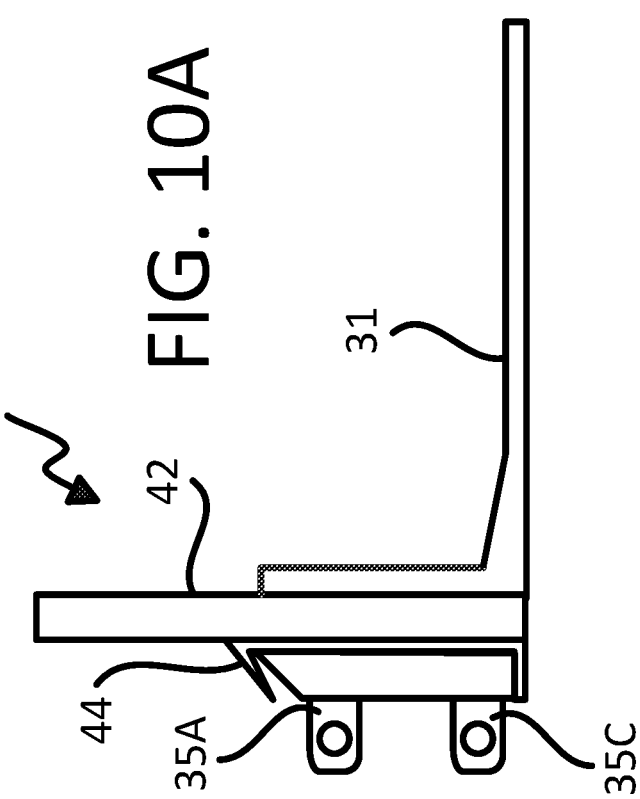

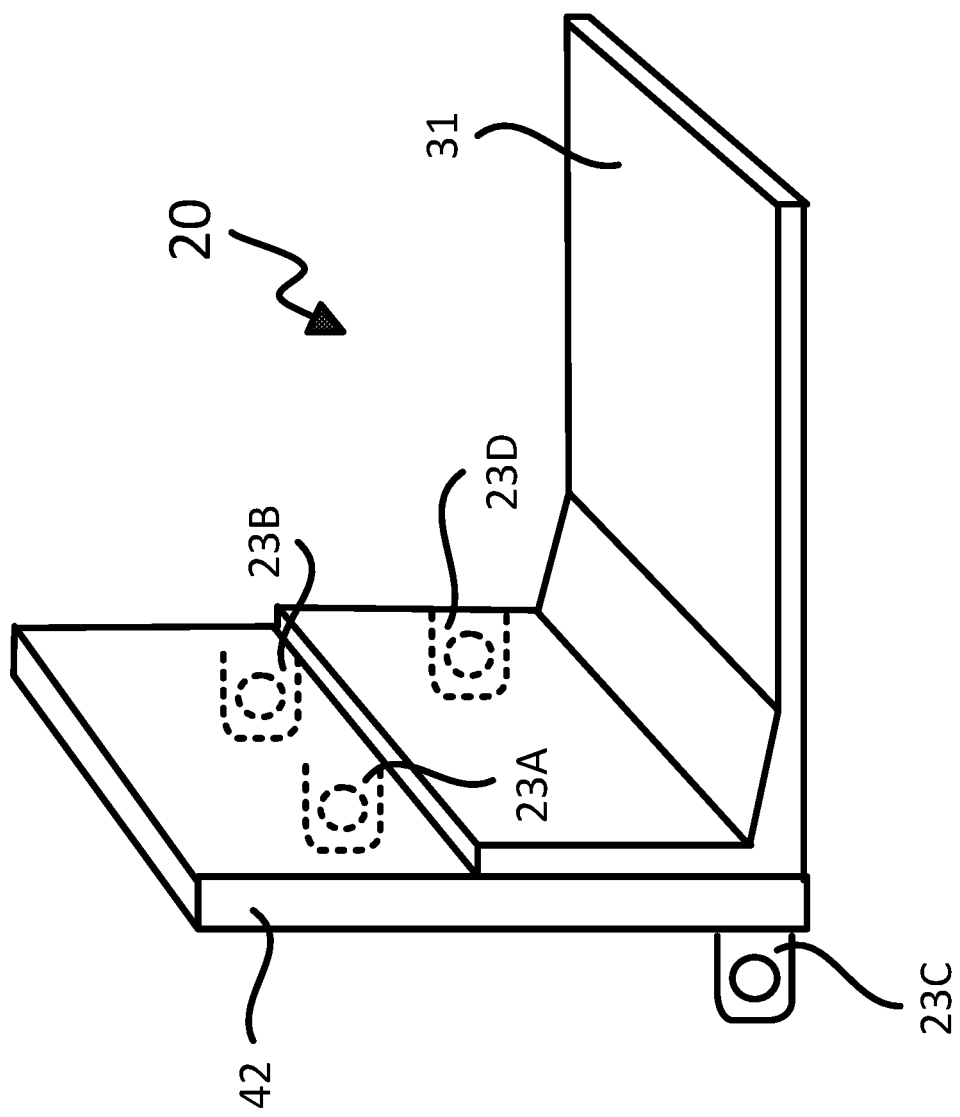

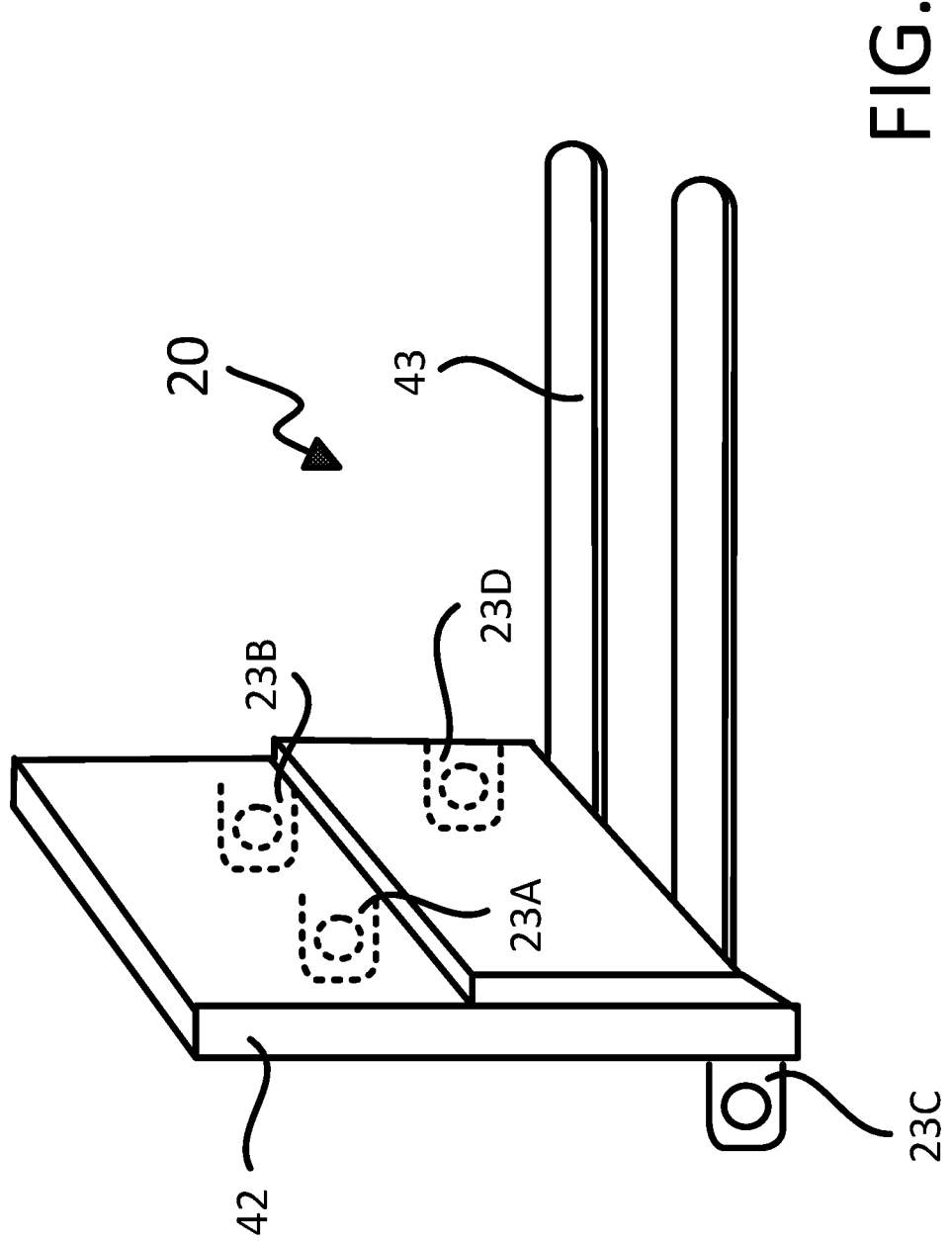

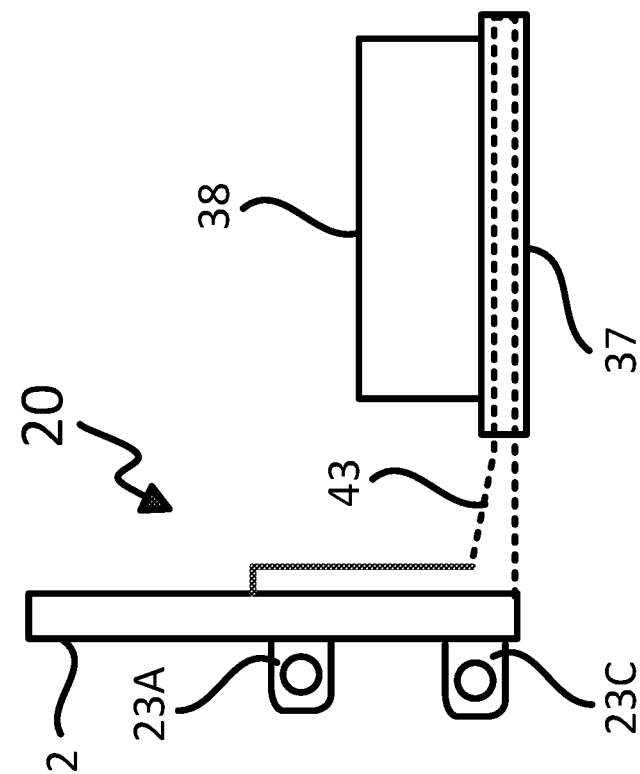
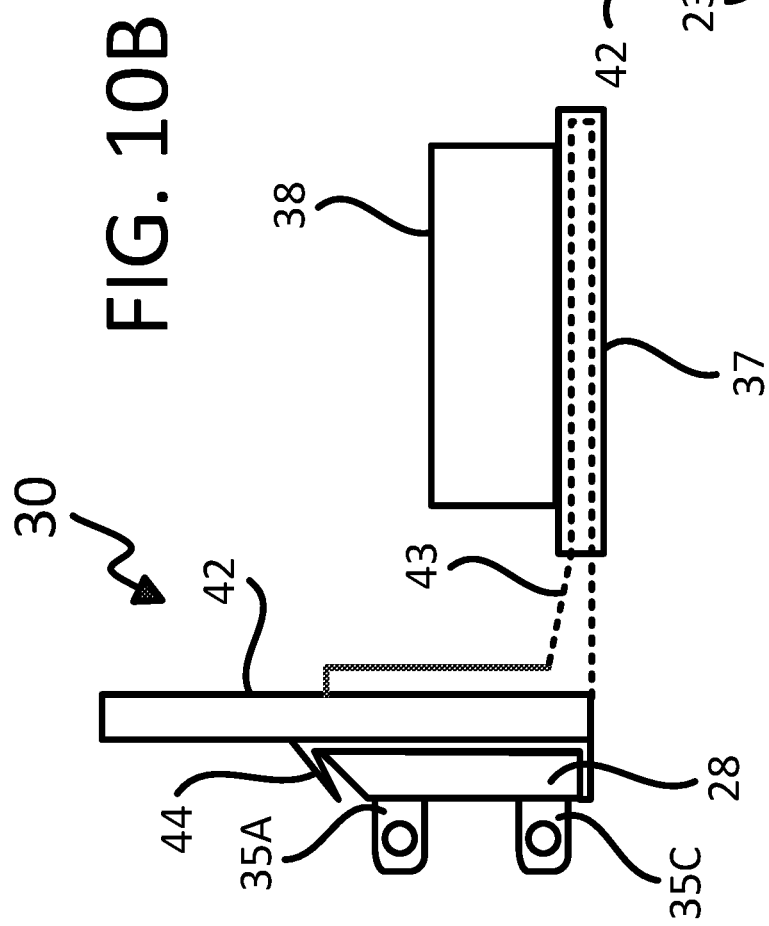

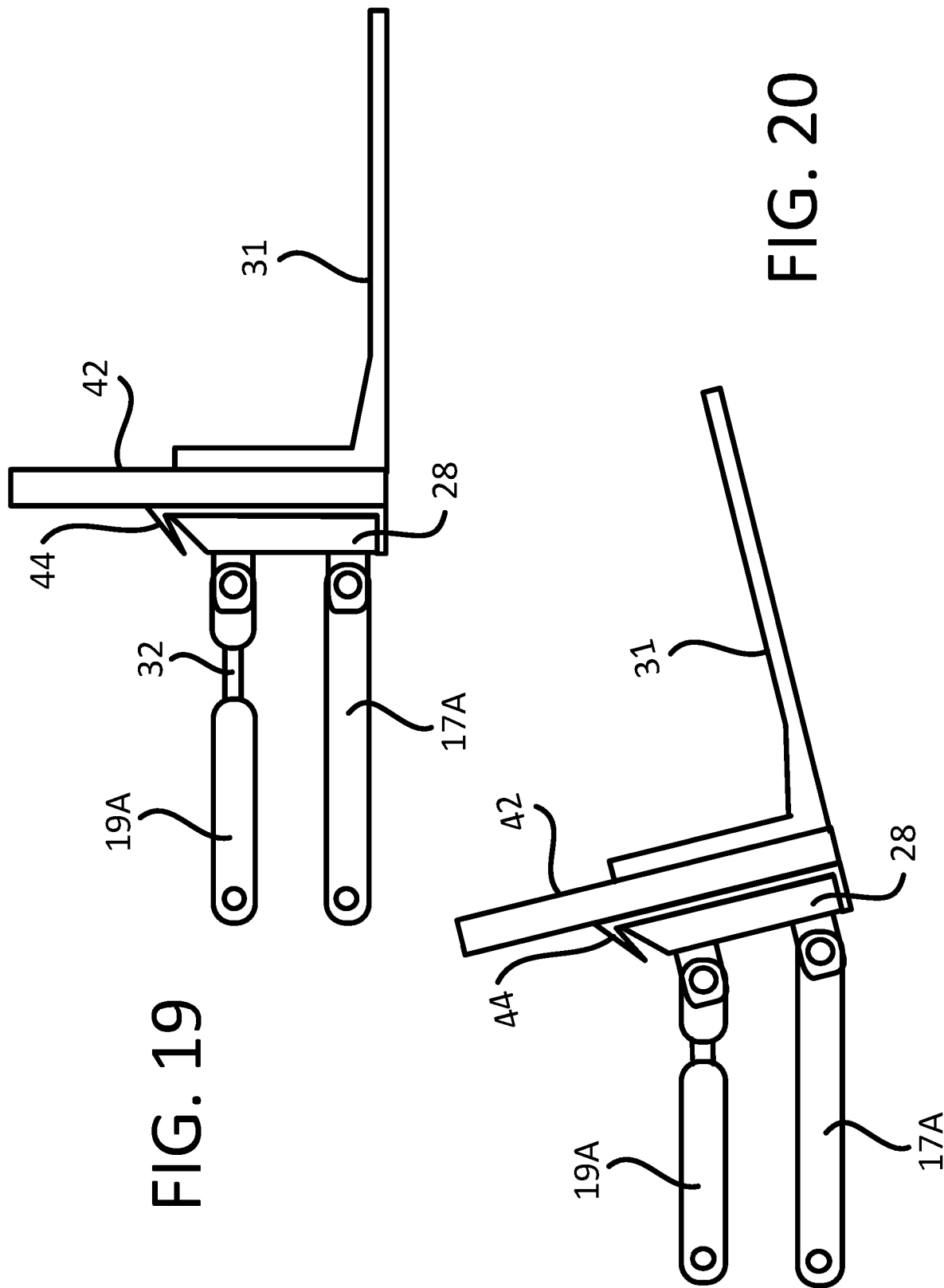

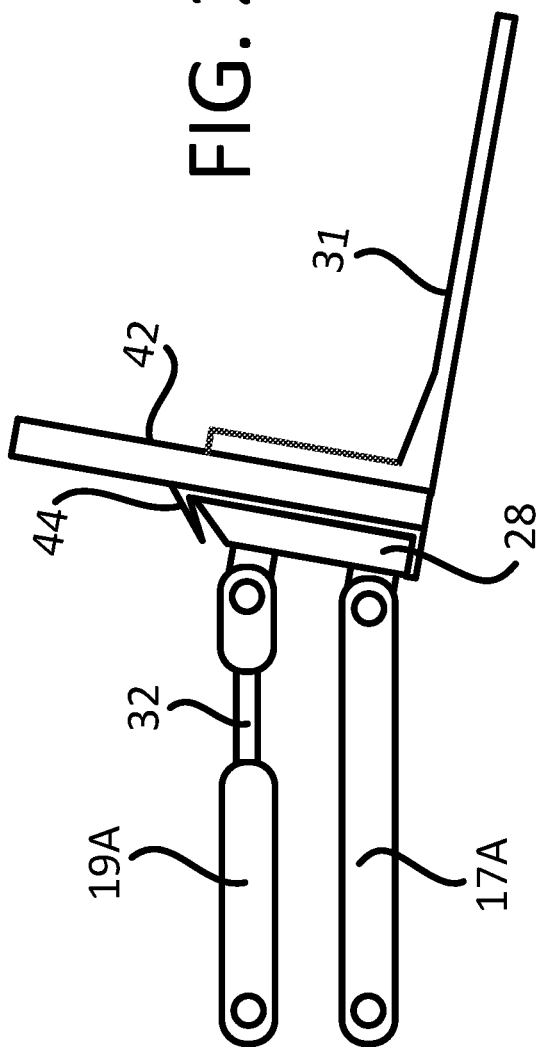
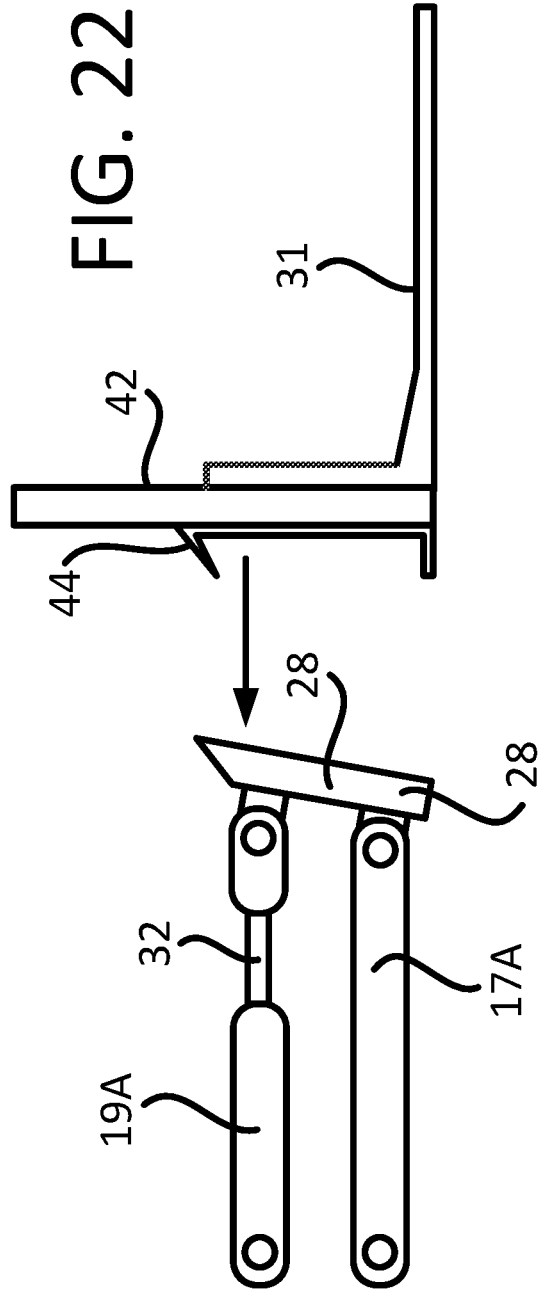

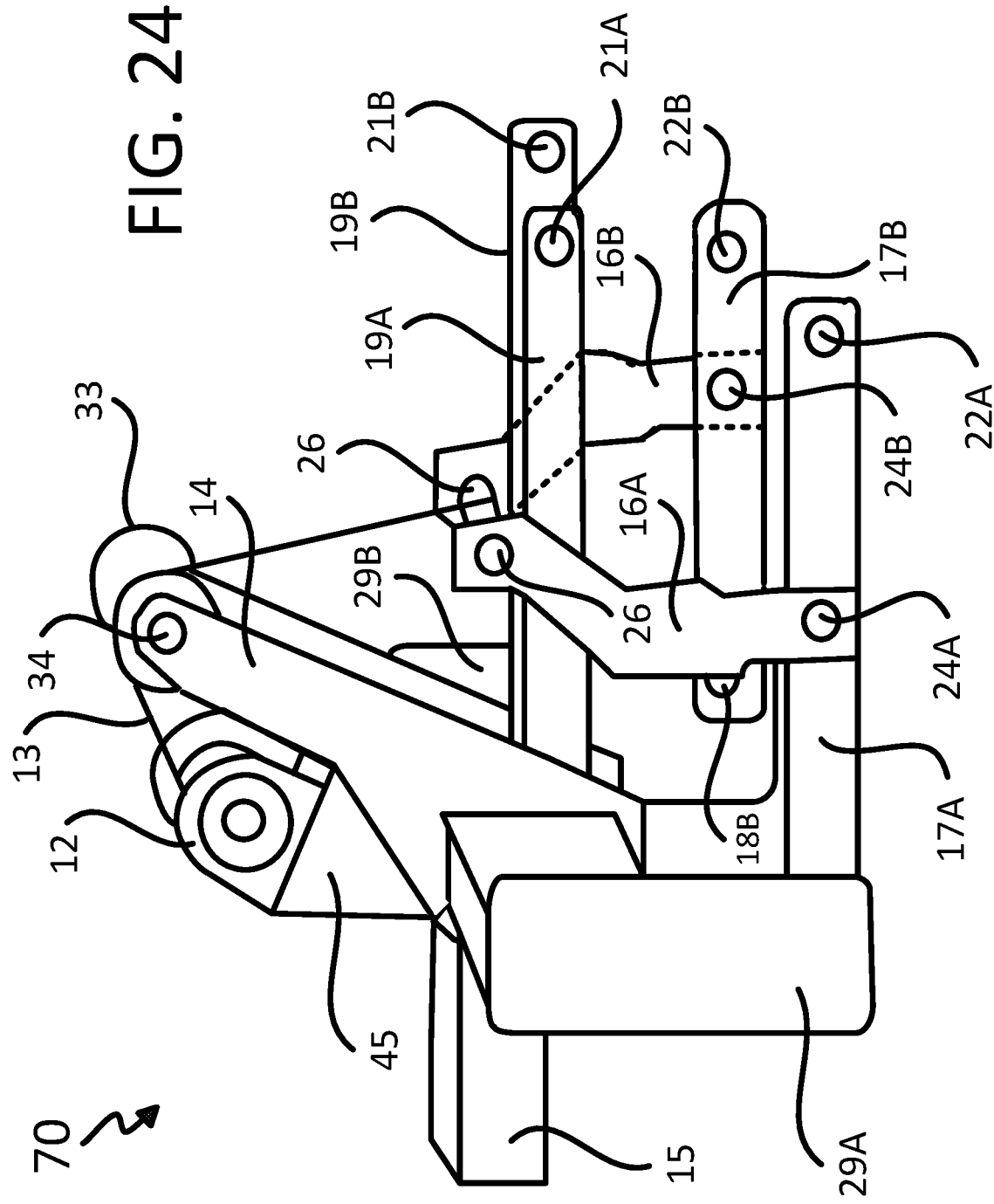

LIFTING DEVICE

FIELD OF THE INVENTION

The present invention generally relates to a device configured for attaching to platforms containing various loads and to lift and move them securely and efficiently while maintaining the platform and the loads in a level position. The loads may contain various objects including cargo, vehicles and equipment placed on the platform.

BACKGROUND OF THE INVENTION

Forklifts are commonly used to pick up and transport pallets with cargo loads stacked onto them. The forklifts are typically equipped with two parallel arms configured to slide under the pallet and with a hydraulic or electrical lift configured to raise the arms and the pallet. One disadvantage of forklifts is the lack of versatility as they are not configured to pick up and haul vehicles that are disposed on platforms, such as snow blowers, cars or tractors. It would, thus be desirable to provide a lift that could be used for lifting and transporting cargo having a wide spectrum of shapes, weights and sizes. It is important that the cargo be kept in a level position or slightly tilted backward so as not to create a hazard of the cargo falling as it is being transported. It would also be desirable that the cargo carrying platforms be configured to tether onto and to untether from the pickup and transporting vehicle safely and expeditiously.

SUMMARY OF THE PRESENT INVENTION

In one aspect of the present invention, a lifting device comprises: a support structure; a first lower horizontal arm pivotally attached at a first end to the support structure; a second lower horizontal arm pivotally attached at a first end to the support structure, the second lower horizontal arm being disposed in substantially the same horizontal plane as the first lower horizontal arm; a first upper horizontal arm pivotally attached at a first end to the support structure, the first upper horizontal arm being disposed above the first lower horizontal arm; a second upper horizontal arm pivotally attached at a first end to the support structure, the second upper horizontal arm being disposed above the second lower horizontal arm and being disposed in substantially the same horizontal plane as the first upper horizontal arm; a first vertical arm having at least one portion disposed perpendicularly with the first lower horizontal arm and at least one portion disposed perpendicularly with the first upper horizontal arm, the first vertical arm being pivotally attached at a first end to about a midpoint of the first lower horizontal arm; a second vertical arm having at least one portion disposed perpendicularly with the second lower horizontal arm and at least one portion disposed in perpendicular with the second upper horizontal arm, the second vertical arm being pivotally attached at a first end to about a midpoint of the first lower horizontal arm; a shaft having a first end attached to a second end of the first vertical arm, the shaft having a second end attached to a second end of the second vertical arm; and a lifting mechanism engaged with the shaft, the lifting mechanism adapted for exerting an upward pulling force on the shaft.

These and other features, aspects and advantages of the present invention will become better understood with reference to the following drawings, description and claims.

BRIEF DESCRIPTION OF THE DRAWINGS

FIG. 7 is a side view of a coupling component for attaching a forklift or a platform to the lifting device;

FIG. 8 portrays a component of the lifting device;

FIGS. 9A to 9D represent various views and configurations of a first embodiment of a load carrying assembly that attaches to the lifting device;

FIGS. 10A and 10B show a second embodiment of a load carrying assembly that attaches to the lifting device;

FIG. 19 illustrates the embodiment of the load carrying assembly described in FIG. 12 combined with the lifting device in a fourth configuration;

FIG. 20 illustrates the embodiment of the load carrying assembly described in FIG. 12 combined with the lifting device in a fifth configuration;

FIG. 21 represents the embodiment of the load carrying assembly described in FIG. 12 combined with the lifting device in a sixth configuration;

FIG. 22 shows the load carrying assembly described in FIG. 12 being detached from the lifting device;

FIG. 24 is a side perspective view of the lifting device according to a fourth embodiment of the present invention.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention.

It is the object of the present invention to provide a lifting device adapted for attaching to a platform configured for lifting and carrying heavy loads including, but not limited to, cargo and vehicles, and for lifting and transporting the platform such that the platform is maintained in a level position to minimize the risk of load droppage off the platform. It is also the object of the present invention to provide a lifting device configured to tether onto and untether off various load carrying platforms quickly and efficiently.

FIGS. 1-24 illustrate the embodiments of the lifting device 10 of the present invention. The lifting device 10 contains two lower horizontal arms 17A and 17B disposed substantially in parallel and in the same horizontal plane to one another. The lifting device 10 also comprises two horizontal upper arms 19A and 19B disposed substantially in parallel to one another and in about the same horizontal plane.

Upper horizontal arms 19A and 19B are disposed in a horizontal plane that is above that of horizontal arms 17A and 17B and located in vertical planes that are between the vertical planes of horizontal arms 17A and 17B.

One end of each of horizontal arms 17A, 17B, 19A and 19B is attached to a part of the lifting device 10 support structure 14. The attachment may be done by pins inserted into holes drilled into the arms and in the support structure and secured by bolts.

The lower arms 17A and 17B are pivotally attached to support members 36A and 36B by pins 18A and 18B respectively and the upper arms 19A and 19B are pivotally attached to the support structure 14 respectively by pins 41A and 41B (not shown).

Figure 1:
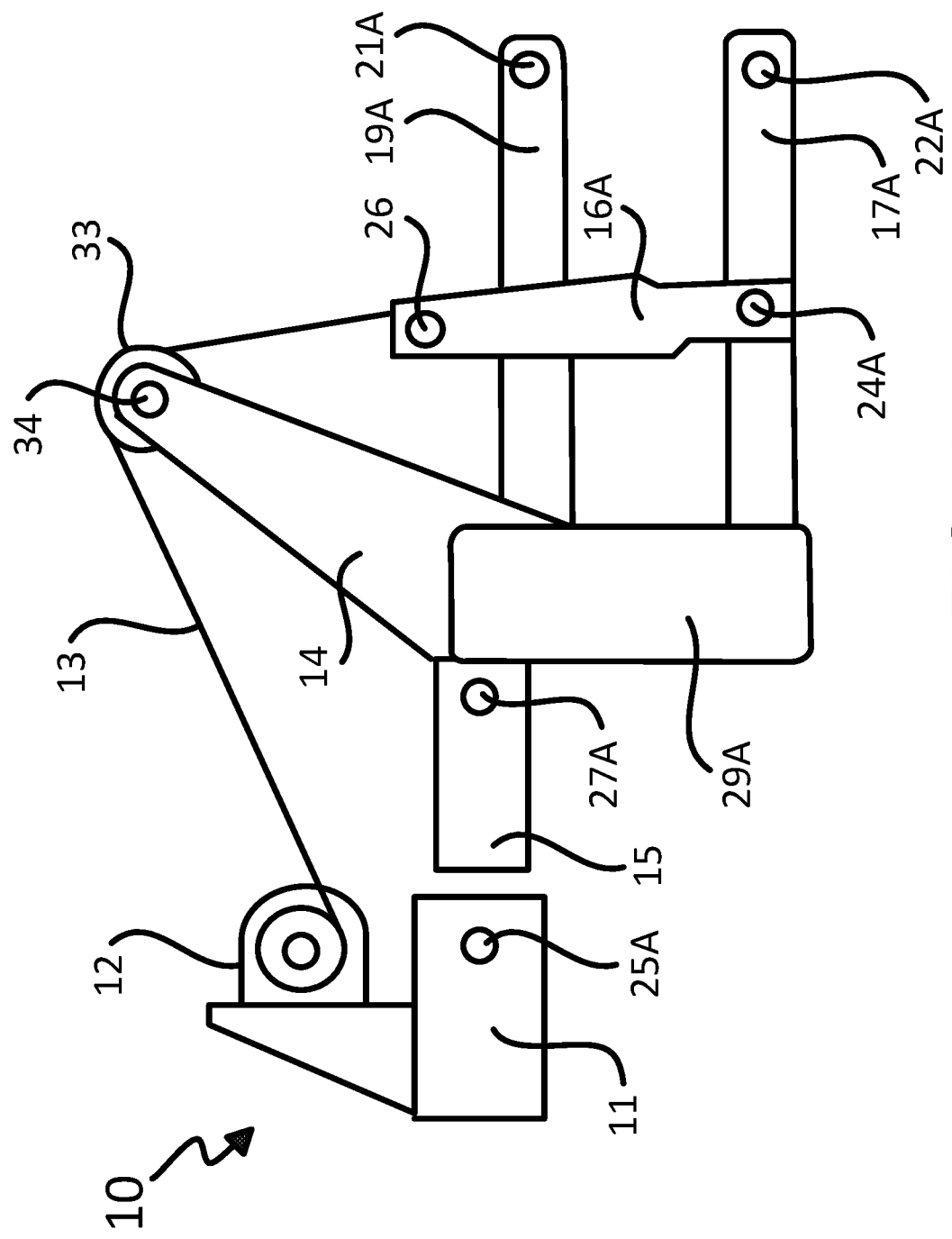
FIG. 1 is a side view of the lifting device according to a first embodiment of the present invention.
Figure 2:
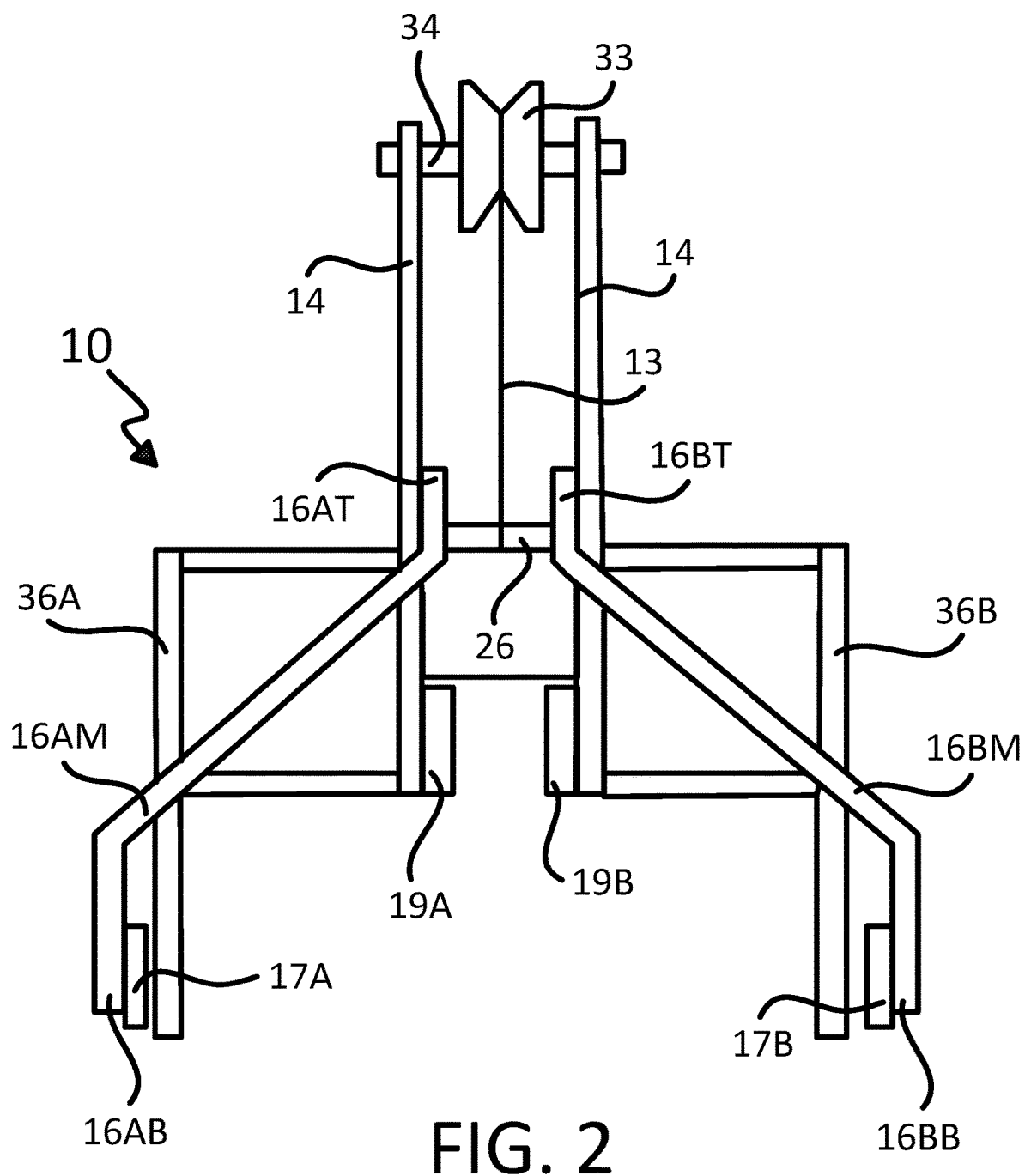
FIG. 2 is a front view of the lifting device according to a first embodiment of the present invention.

Vertical arms 16A and 16B are attached to and configured for lifting the horizontal arms 17A and 17B. Each of the vertical arms 16A and 16B contains a top portion 16AT and 16BT respectively that are disposed substantially vertically, a middle portion 16AM and 16BM angled at about 45 degrees toward horizontal arms 17A and 17B and a bottom substantially vertical portion 16AB and 16BB as shown in FIG. 2. A shaft 26 connects the top portions of the vertical arms 16AT and 16BT while the bottom vertical portions 16AB and 16BB of vertical arms 16A and 16B are pivotally attached to about a middle of each lower horizontal arm 17A and 17B by pins 24A and 24B respectively that are secured by bolts.

A lifting mechanism is engaged with the shaft 26 such that exerting an upward pull on the shaft 26 results in an upward movement of the vertical arms 16A and 16B and upward pivoting of the lower horizontal arms 17A and 17B. The lifting mechanism may be powered in several ways:

1. A cable 13 wound onto shaft 26 is actuated by winch 12 that is disposed on base 45 of the supporting structure 14 of the lifting device 70 as shown in FIG. 24. Pin 34 that is part of pulley 33 provides support to the cable 13.

Figure 3:
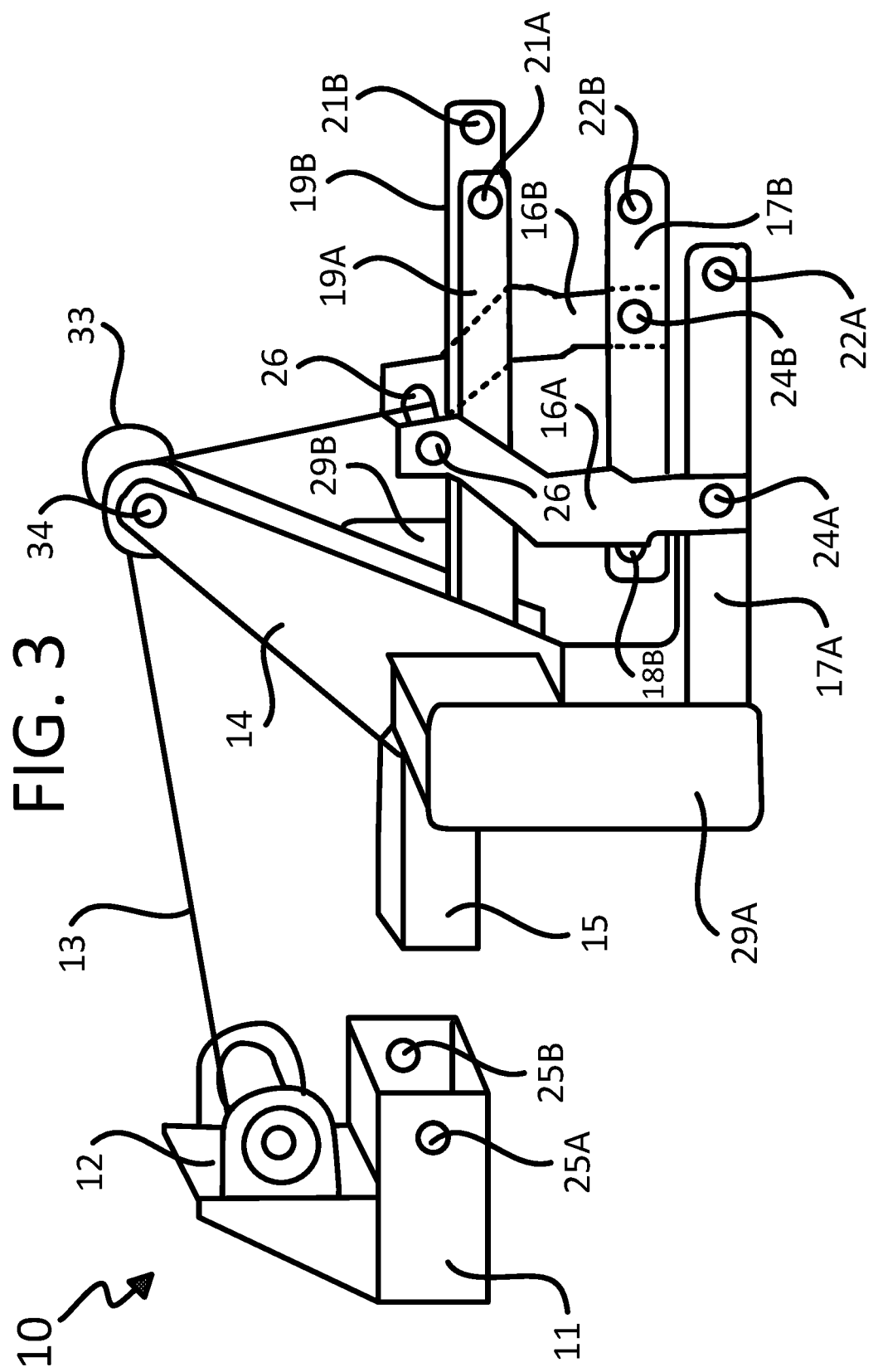
FIG. 3 is a side perspective view of the lifting device according to a first embodiment of the present invention.

2. The winch 12 actuating the cable 13 is installed on a vehicle and the lifting device 10 is attached to the vehicle. FIG. 3 illustrates an attachment embodiment of the lifting device 10 to the vehicle. Tube 15 on the lifting device 10 is configured for inserting into tube 11 located on the vehicle and attached by a bolted pin passed through holes 25A and 25B in tube 11 and holes 27A and 27B (not shown) in tube 15. Pin 34 that is part of pulley 33 supports the cable 13.

Figure 23:
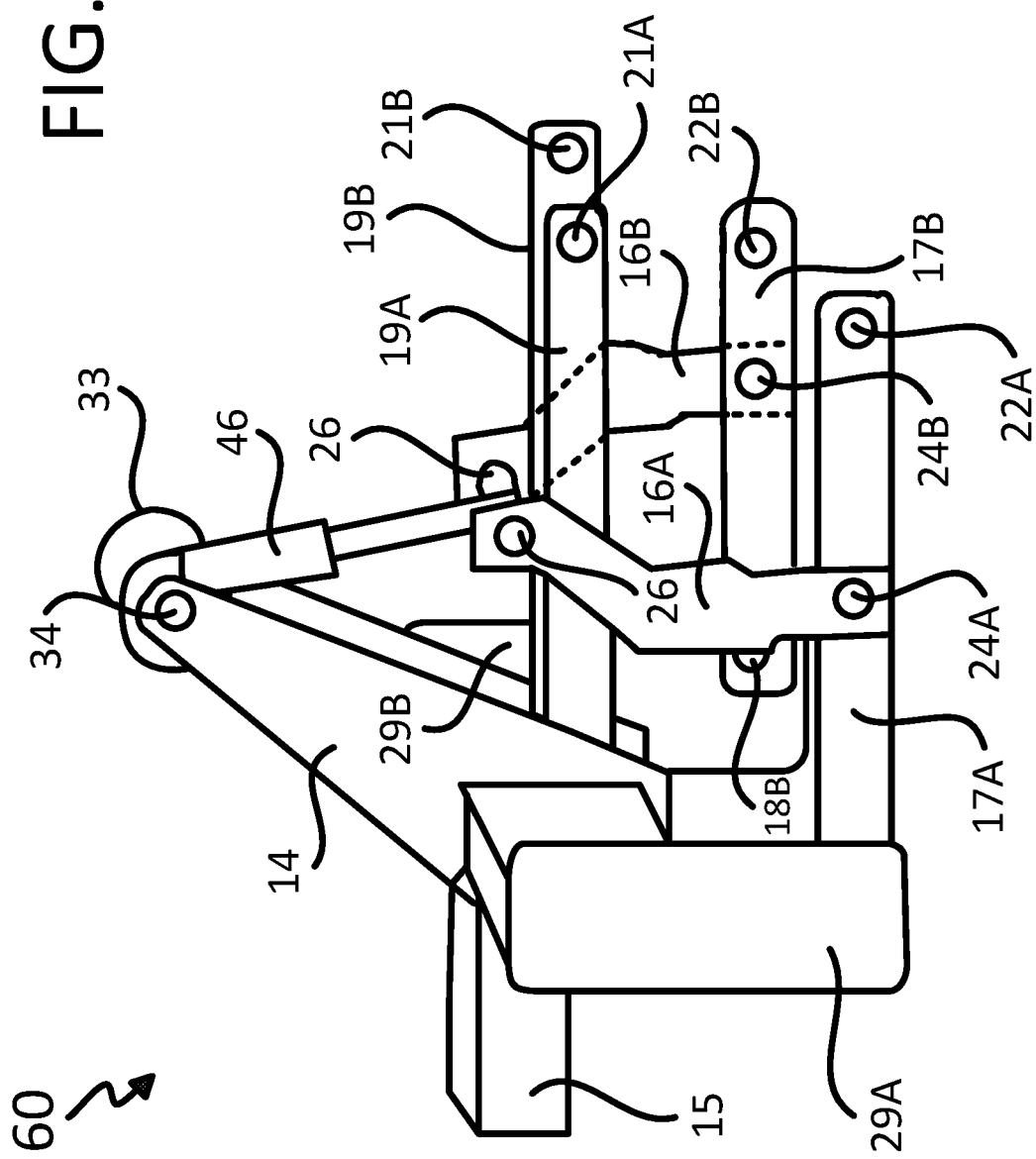
FIG. 23 is a side perspective view of the lifting device according to a third embodiment of the present invention.

3. A piston 46 operated hydraulically or electrically is installed on the support structure of the lifting device 60 as shown in FIG. 23.

The forward ends of the horizontal arms 17A, 17B, 19A and 19B are adapted for attaching to a load carrying assembly 20 such as a platform of fork lift. In one embodiment portrayed in FIGS. 9A-9D, the load carrying assembly 20 comprises a vertical support 42, a platform 31, and upper extensions 23A and 23B and lower extensions 23C and 23D attached to the vertical support 42. Each extension 23A, 23B, 23C and 23D of the load carrying assembly 20 contains a center hole. The platform 31 may contain a cargo or be utilized as a forklift for picking up a pallet 37 on forks 43 that carries a load 38.

In another load carrying assembly embodiment 30, a containment member 44 is attached to the vertical support 42. Coupling member 28, to which an upper extensions 35A and 35B (not shown) and lower extension 35C and 35D (also not shown) are attached, is wedged inside the containment member 44. The placement of the extensions 35A, 35B, 35C and 35C is similar to that illustrated in FIGS. 10A-10B. Each extension 35A, 35B, 35C and 35C contains a center hole.

The attachment of load carrying assembly 20 to the lifting device 10 is made by:

1) lining up the holes 21A and 21B of the lifting device 10 upper arms 19A and 19B with the holes of extensions 23A and 23B respectively, 2) lining up the holes 22A and 22B of the lifting device 10 lower arms 17A and 17B with the holes of extensions 23C and 23D respectively, and 3) inserting bolted pins 39 through all the lined up holes to lock the attachment of the load carrying assembly 20 to the lifting device 10. The combined load carrying assembly 20 and lifting device 40 is shown in various configurations in FIGS. 13, 15 and 16.

The attachment of load carrying assembly 30 to the lifting device 10 is made by:

1. lining up the holes 21A and 21B of the lifting device 10 upper arms 19A and 19B with the holes of extensions 35A and 35B on the coupling member 28 respectively, 2. lining up the holes 22A and 22B of the lifting device 10 lower arms 17A and 17B with the holes of extensions 35C and 35D respectively, and 3. inserting bolted pins 39 through all the lined up holes to lock the attachment of the load carrying assembly 30 to the lifting device 10. The combined load carrying assembly 30 and lifting device 50 is shown in various configurations in FIGS. 14, 17 and 18.

Figure 15:
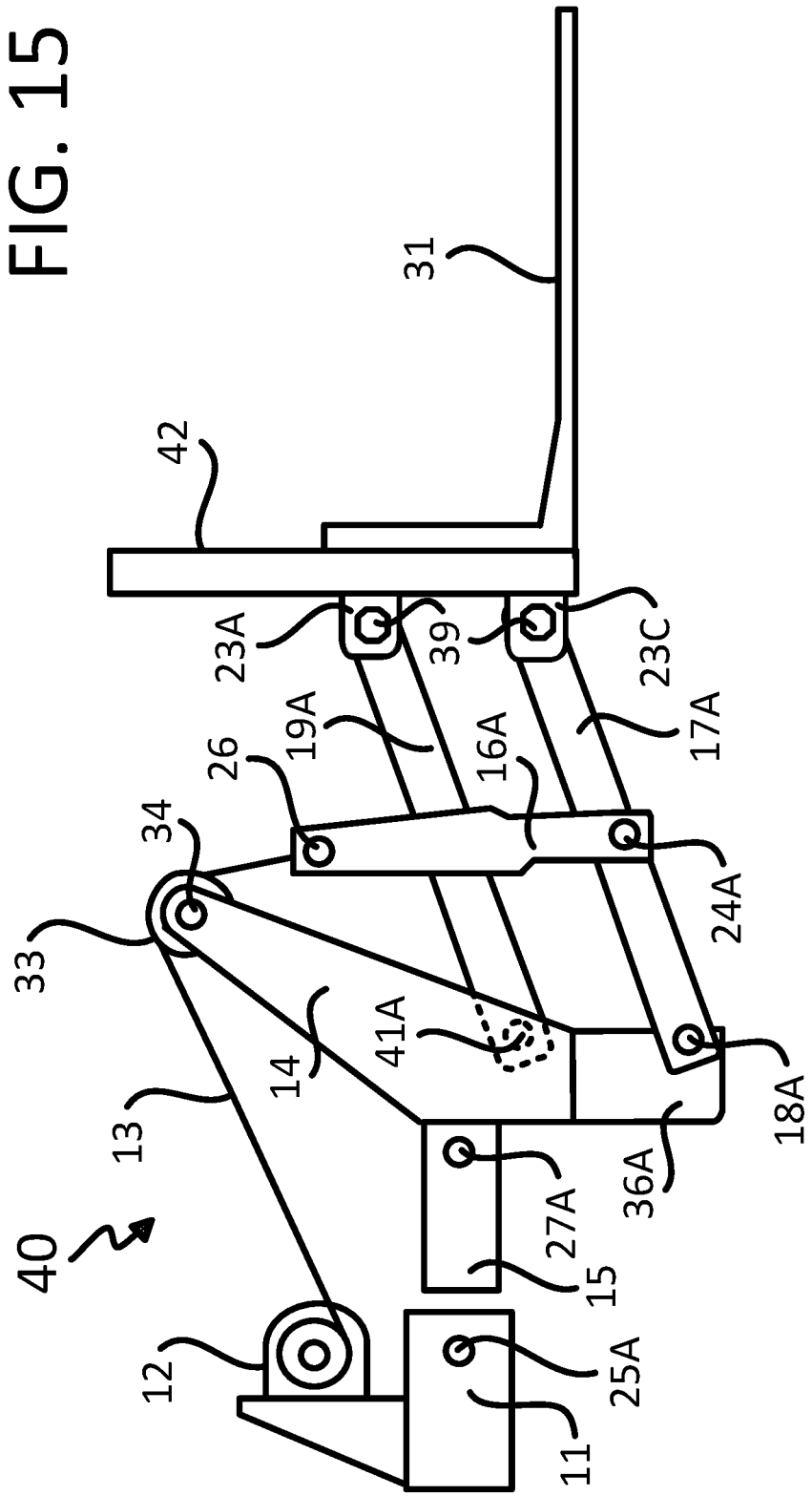
FIG. 15 depicts the load carrying assembly of the first embodiment combined with the lifting device in a second configuration.
Figure 16:
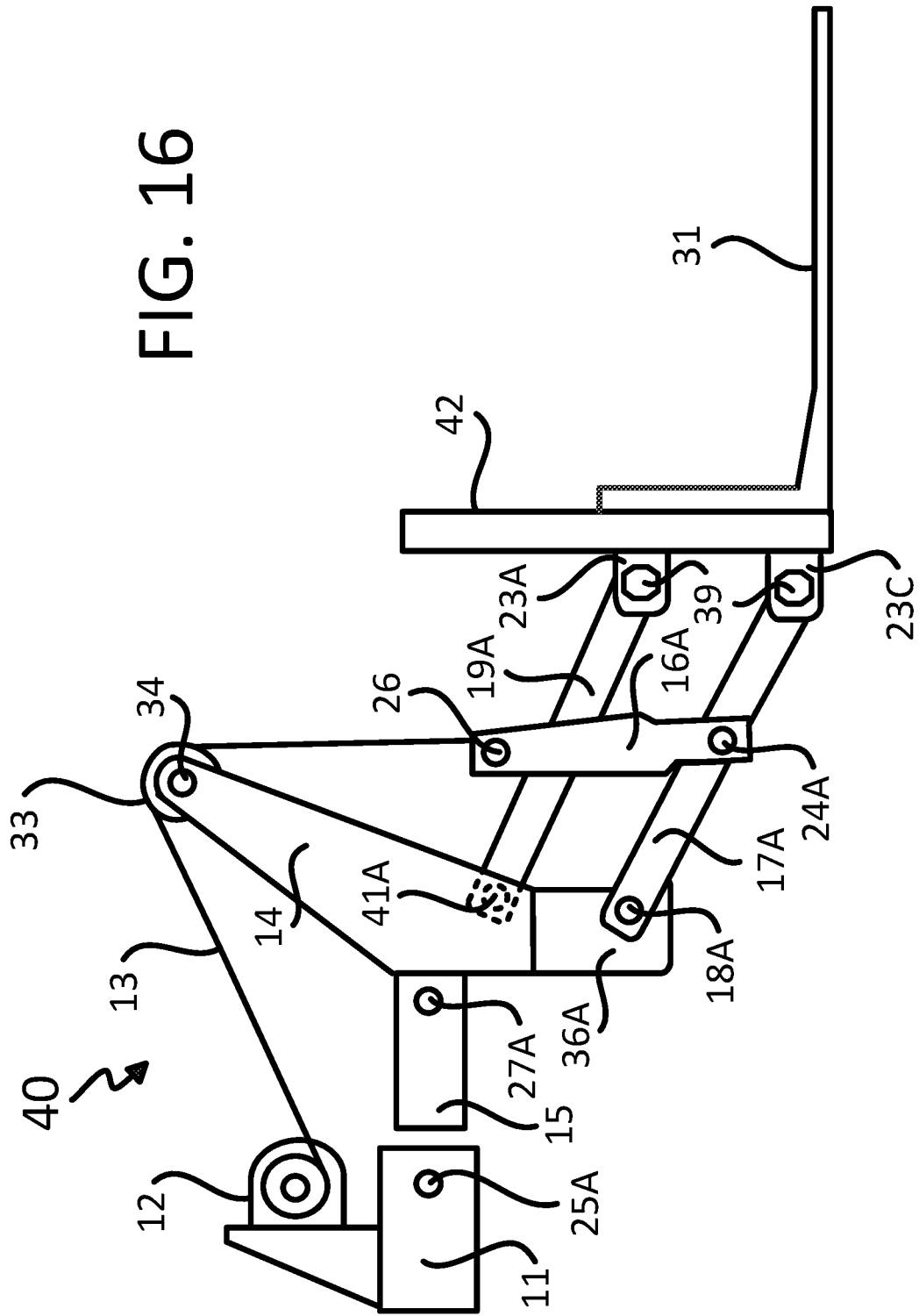
FIG. 16 depicts the load carrying assembly of the first embodiment combined with the lifting device in a third configuration.
Figure 17:
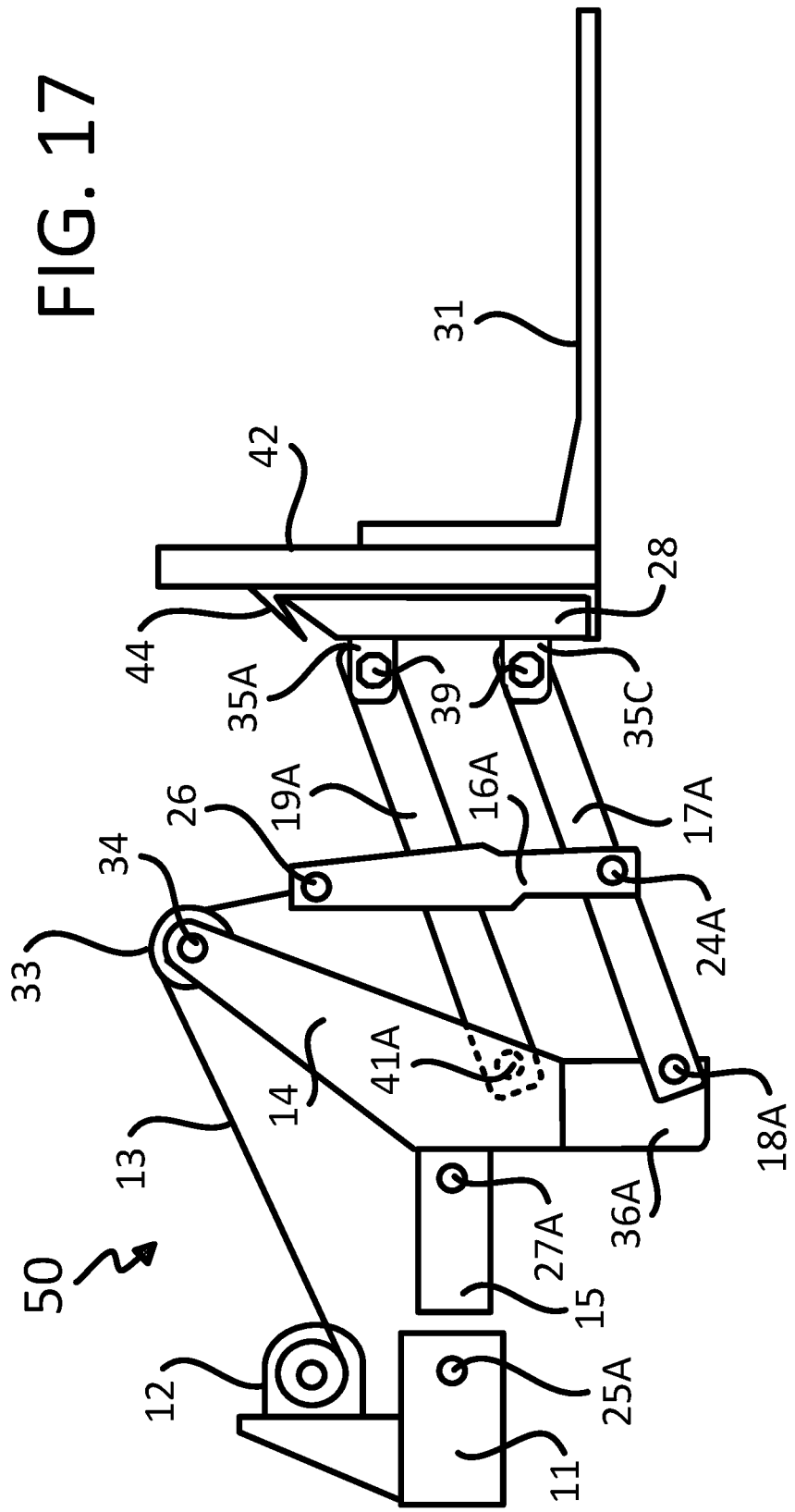
FIG. 17 portrays the load carrying assembly of the second embodiment combined with the lifting device in a second configuration.
Figure 18:
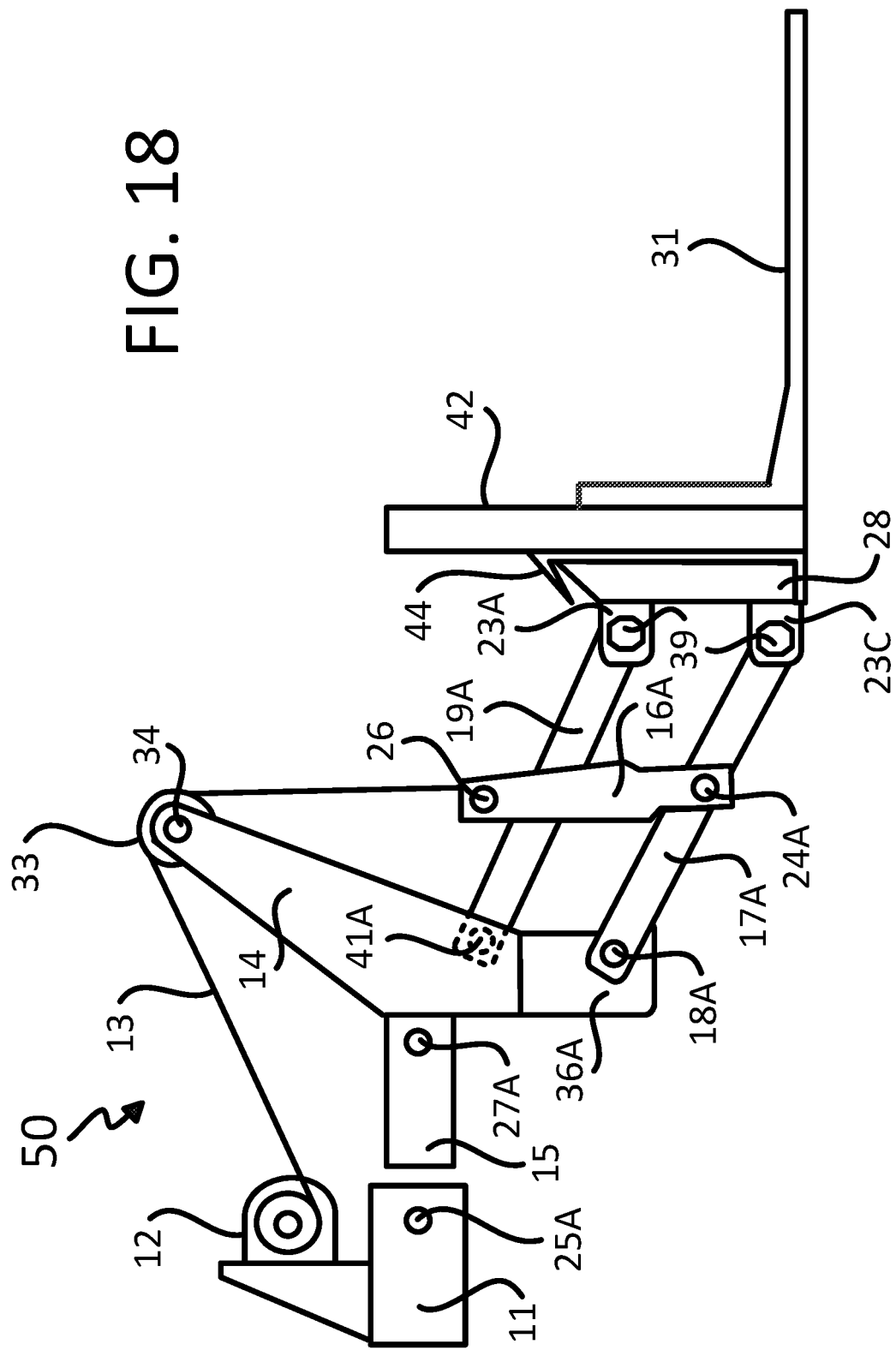
FIG. 18 portrays the load carrying assembly of the second embodiment combined with the lifting device in a third configuration.

Engaging the lifting mechanism to exert an upward pull on shaft 26 while the load carrying assembly is attached to the lifting device creates an upward pull on vertical arms 16A and 16B and lower horizontal arms 17A and 17B that pivot upward since they are attached to vertical arms 16A and 16B. The upward pivoting of the lower horizontal arms 17A and 17B also causes the upward lifting of the load carrying assembly as it is attached to the lower horizontal arms 17A and 17B and causes the upward lifting of the upper horizontal arms 19A and 19B as they are attached to the load carrying assembly as shown in FIGS. 15 and 17. This allows the load carrying assembly to be transported to its destination where the lifting mechanism is engaged to lower the load carrying assembly and place it on the ground such as it is shown in FIGS. 16 and 18.

The attachment of the lifting device 10 to the load carrying assembly that is accomplished by inserting bolted pins through the upper arms 19A and 19B, the lower arms 17A and 17B and the extensions 23A, 23B, 23C and 23D or 35A, 35B, 35C and 35D must be firm yet allow some pivoting in lifting the arms and the load carrying assembly. This may result in premature wear and tear on the arms, however. To remedy this problem, horizontal lift arms 17A, 17B, 19A and 19B are configured to be extendable and retractable. Vertical lift arms 16A and 16B may also be configured to be extendable and retractable in order to enable adjusting the positions of the horizontal arms relative to the vertical arms for optimum stability of the lifting device. Also, in many cases where the cargo is excessively heavy or has irregular shape, it is desirable to tilt the load carrying assembly backward to enhance the stability of the cargo in transportation. Also, in order to safely discharge the cargo, it may be desirable to slightly tilt the load carrying assembly forward. As will be seen, the extendable and retractable feature of the arms helps to accomplish this as well as helps disconnect the load carrying assembly 30 from the lifting device 10. Lift arm extension may be accomplished by electric actuation, hydraulic power or spring loading. An extension member 32 is adapted to move forward or rearward to bring about lengthening or shortening an arm.

Generally, in the course of using the lifting device, only the upper lift arms 19A and 19B or the lower lift arms 17A and 17B need to be extended or retracted. FIG. 8 shows an exemplary embodiment of an extendable and retractable arm.

FIGS. 19, 20, 21 and 22 show configurations for the lifting device 10 utilizing a coupling member 28 and utilizing extendable and retractable upper horizontal arms 19A and 19B. In order to tilt the load carrying assembly 30 backward, upper horizontal arms 19A and 19B are retracted while in order to tilt the load carrying assembly 30 forward, the horizontal arms 19A and 19B are extended toward the load carrying assembly 30. It is noted that tilting the load carrying assembly 30 backward may also be achieved by extending the lower lift arms 17A and 17B extended toward the load carrying assembly 30, while tilting the load carrying assembly 30 forward may be achieved by retracting the lower lift arms 17A and 17B. The use of the retractable and extendable arms to tilt the load carrying assembly 30 improves the stability of the load carrying assembly 30 in transportation and in discharging the load.

The downward tilting of the load carrying assembly 30 enables detaching the load carrying assembly 20 while leaving coupling member 28 attached to arms 17 and 19 as shown in FIGS. 21 and 22. This enables the load carrying assembly 30 containing the coupling member 28 to couple with and uncouple from various load carrying assemblies with speed and efficiency.

Figure 4:
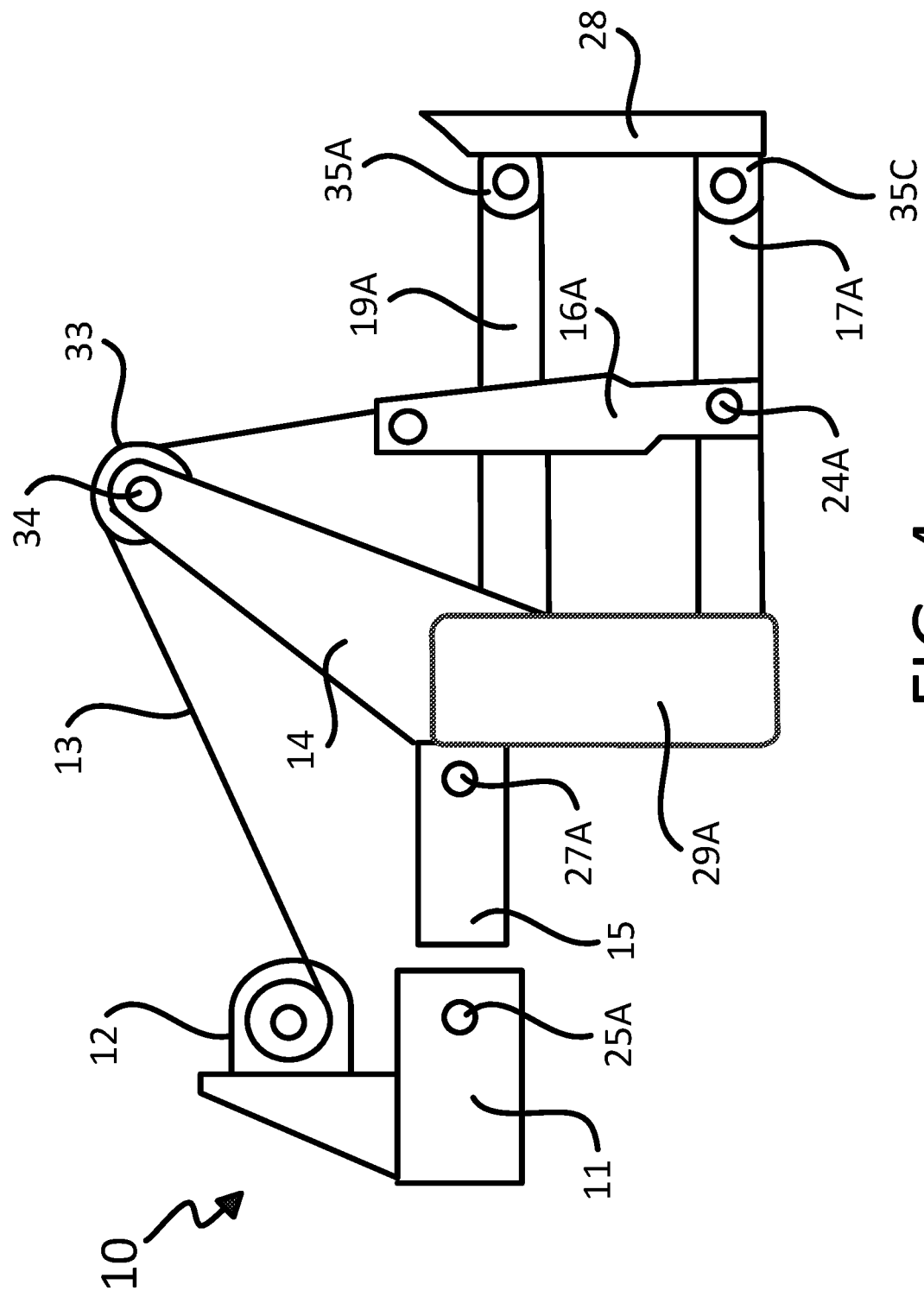
FIG. 4 illustrates a side view of the lifting device according to a second embodiment of the present invention.
Figure 5:
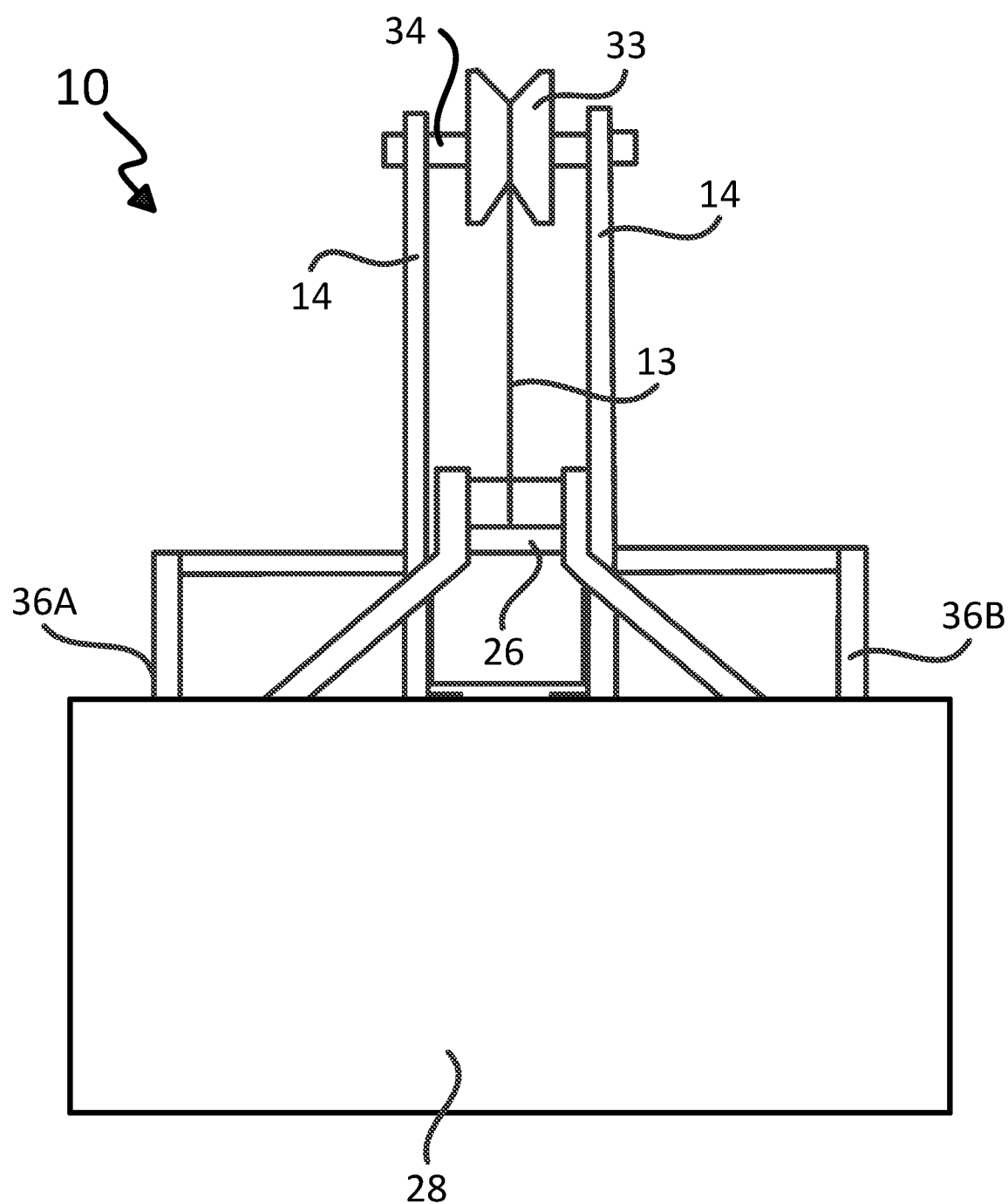
FIG. 5 illustrates a front view of the lifting device according to a second embodiment of the present invention.
Figure 6:
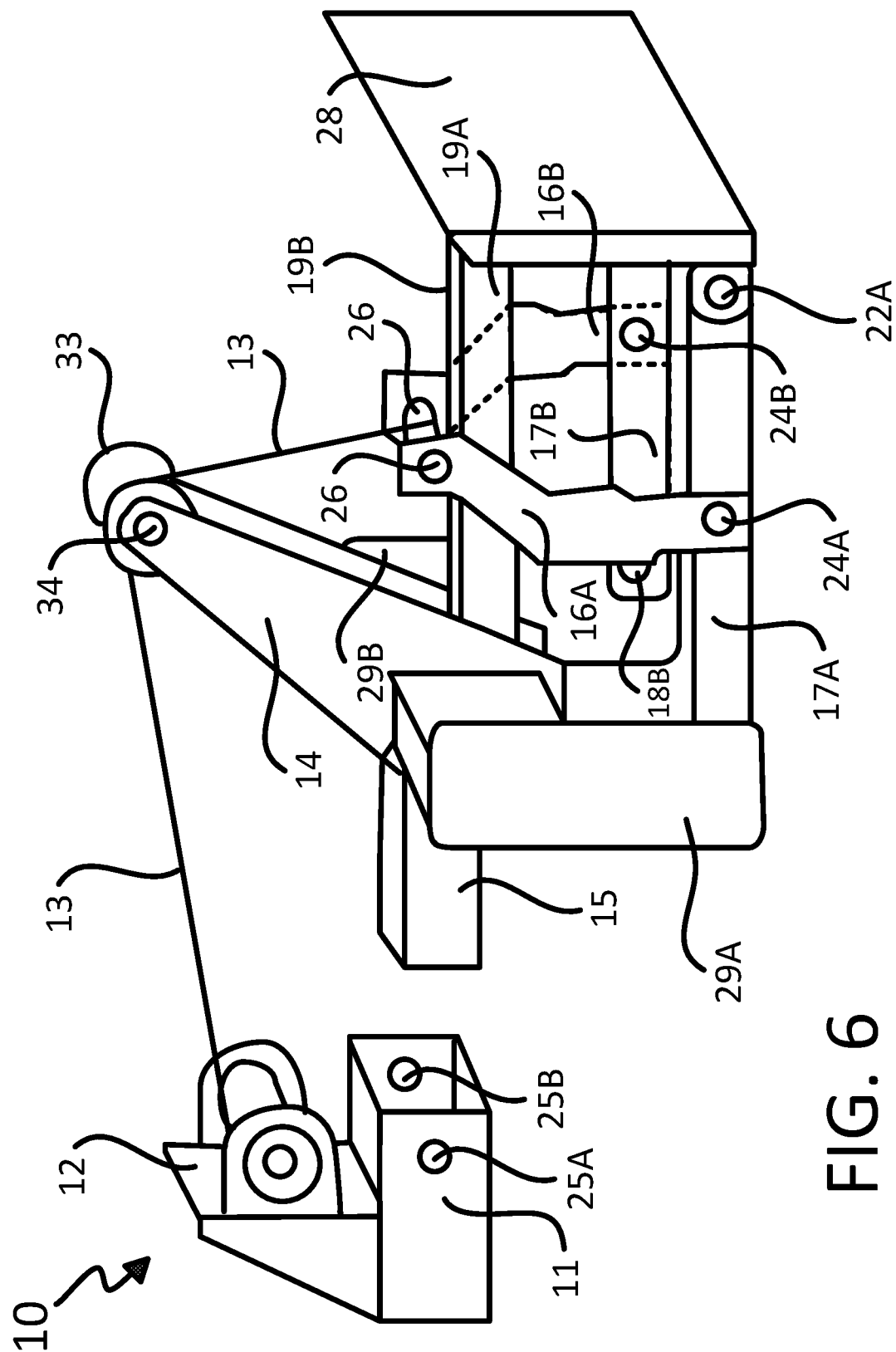
FIG. 6 is a side perspective view of the lifting device according to a second embodiment of the present invention.
Figure 11:
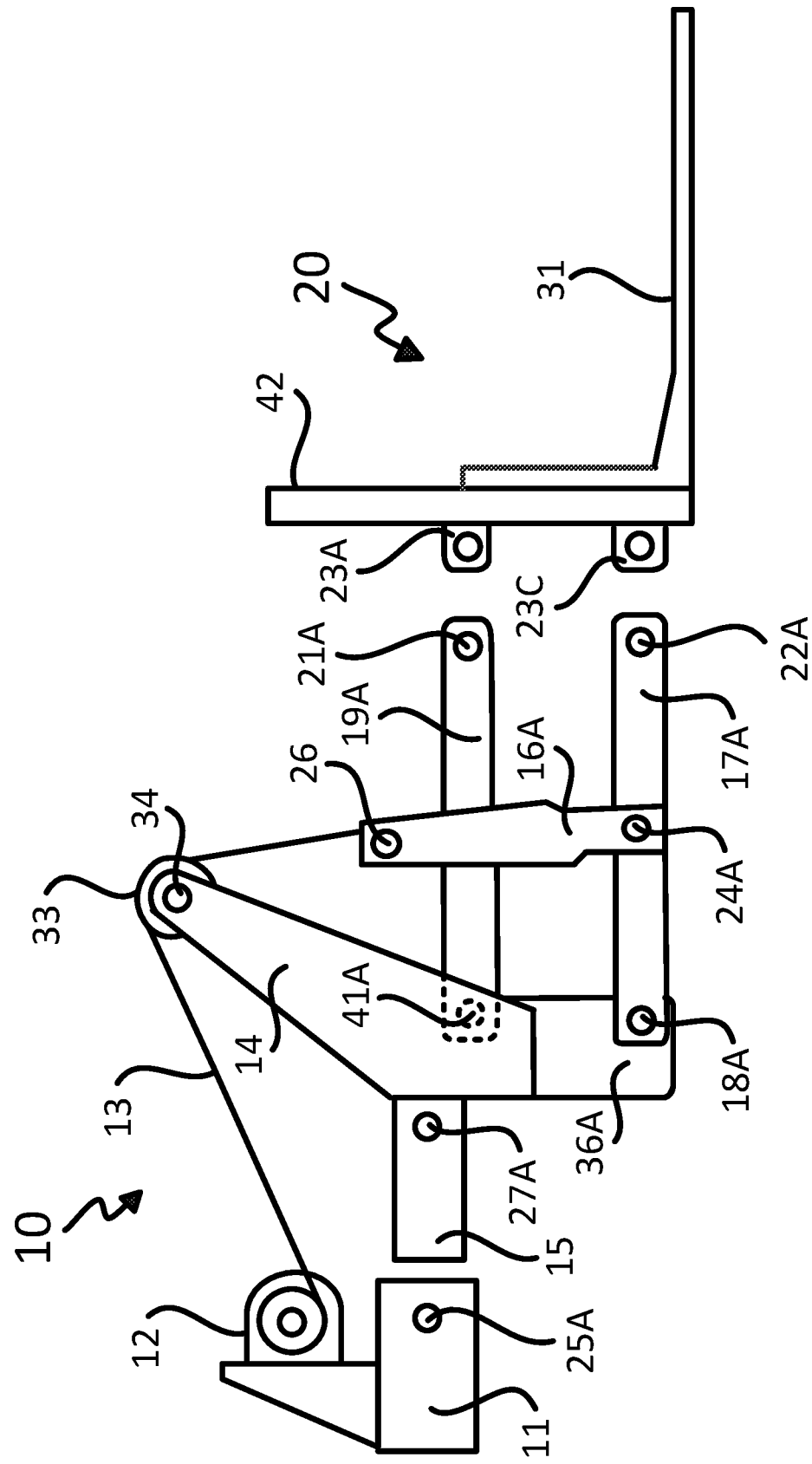
FIG. 11 shows the first embodiment of the load carrying assembly in position for attaching to the lifting device.
Figure 12:
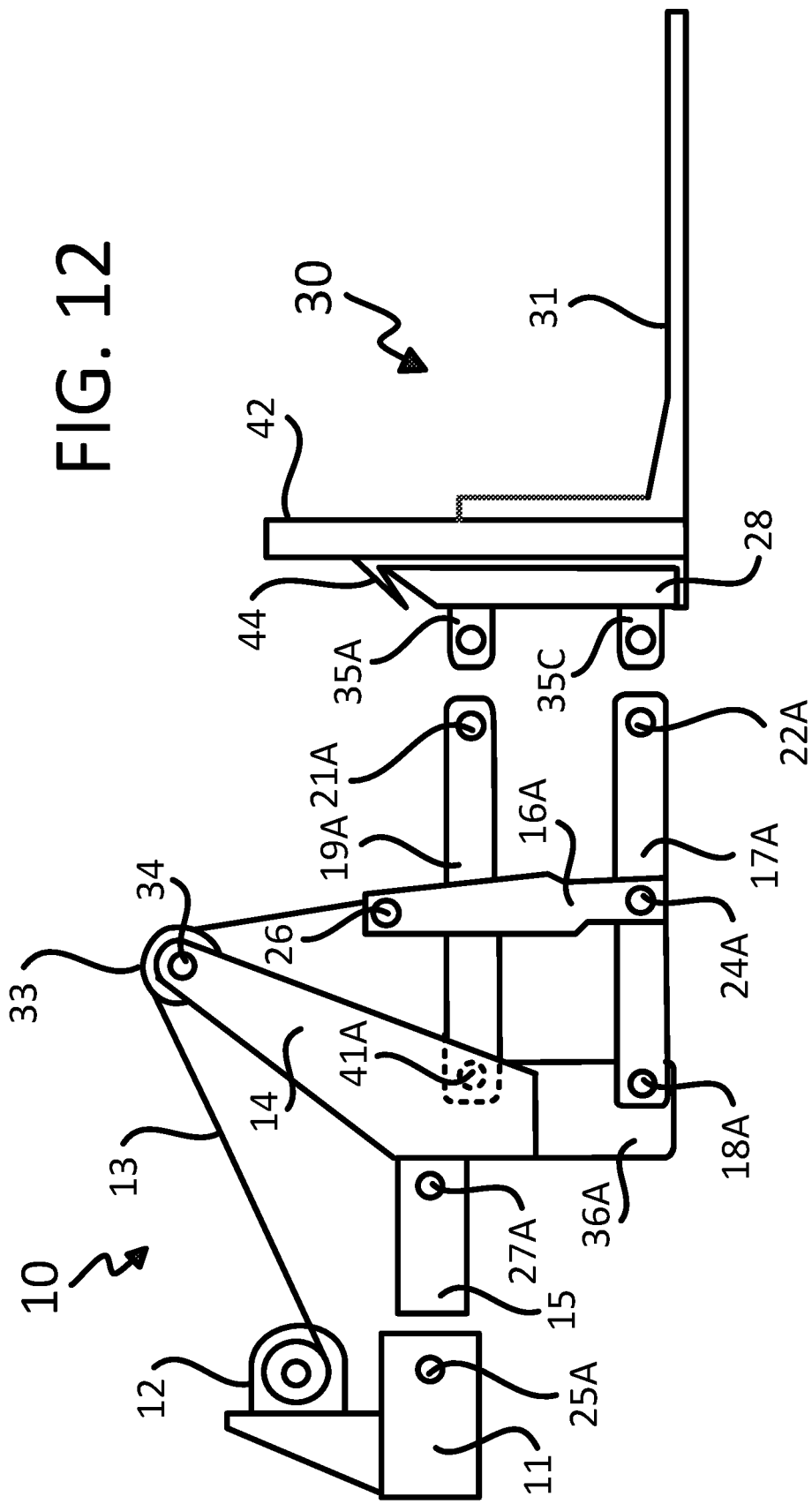
FIG. 12 illustrates the second embodiment of the load carrying assembly in position for attaching to the lifting device.
Figure 13:
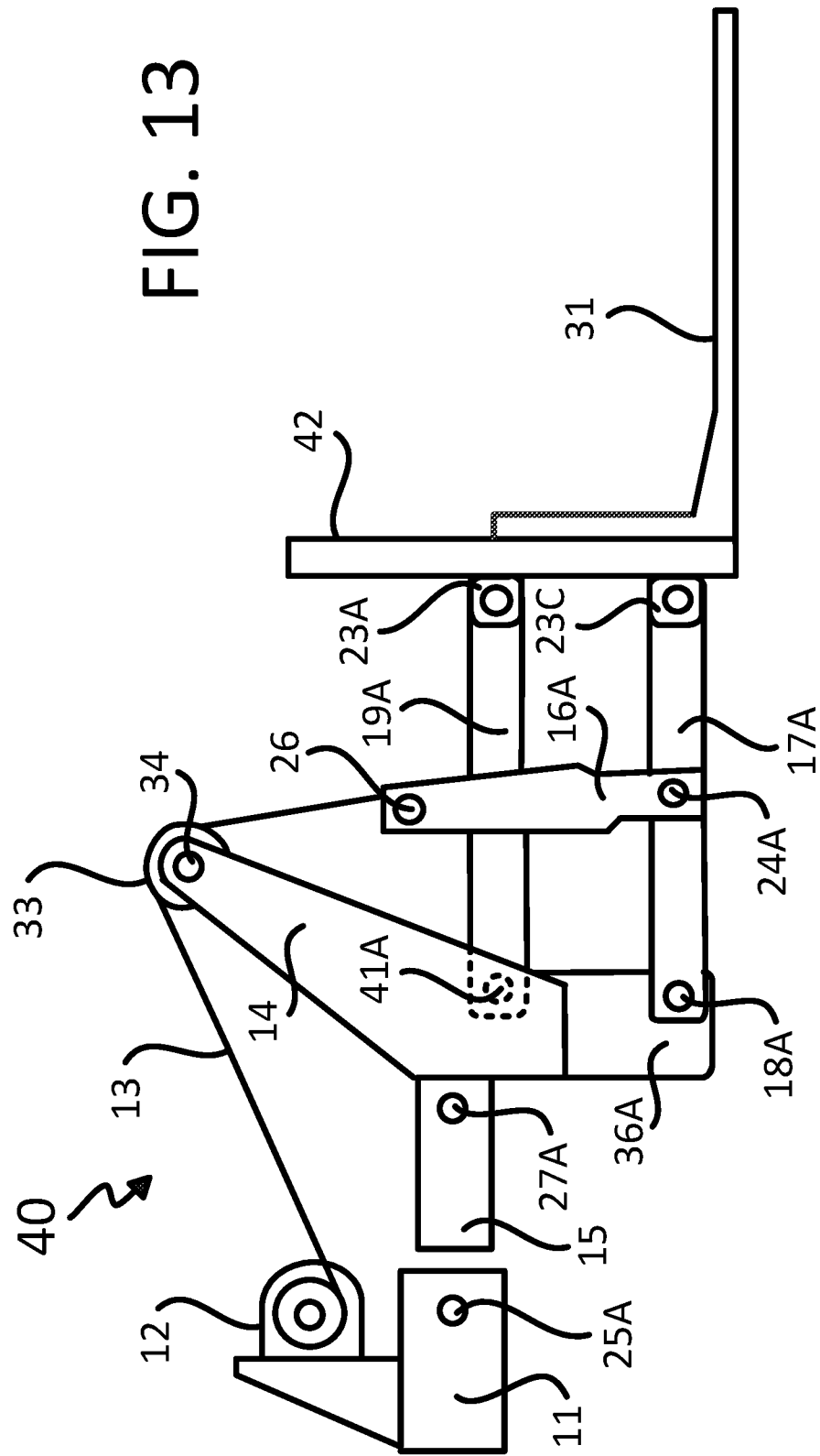
FIG. 13 illustrates the load carrying assembly of the first embodiment combined with the lifting device in a first configuration.
Figure 14:
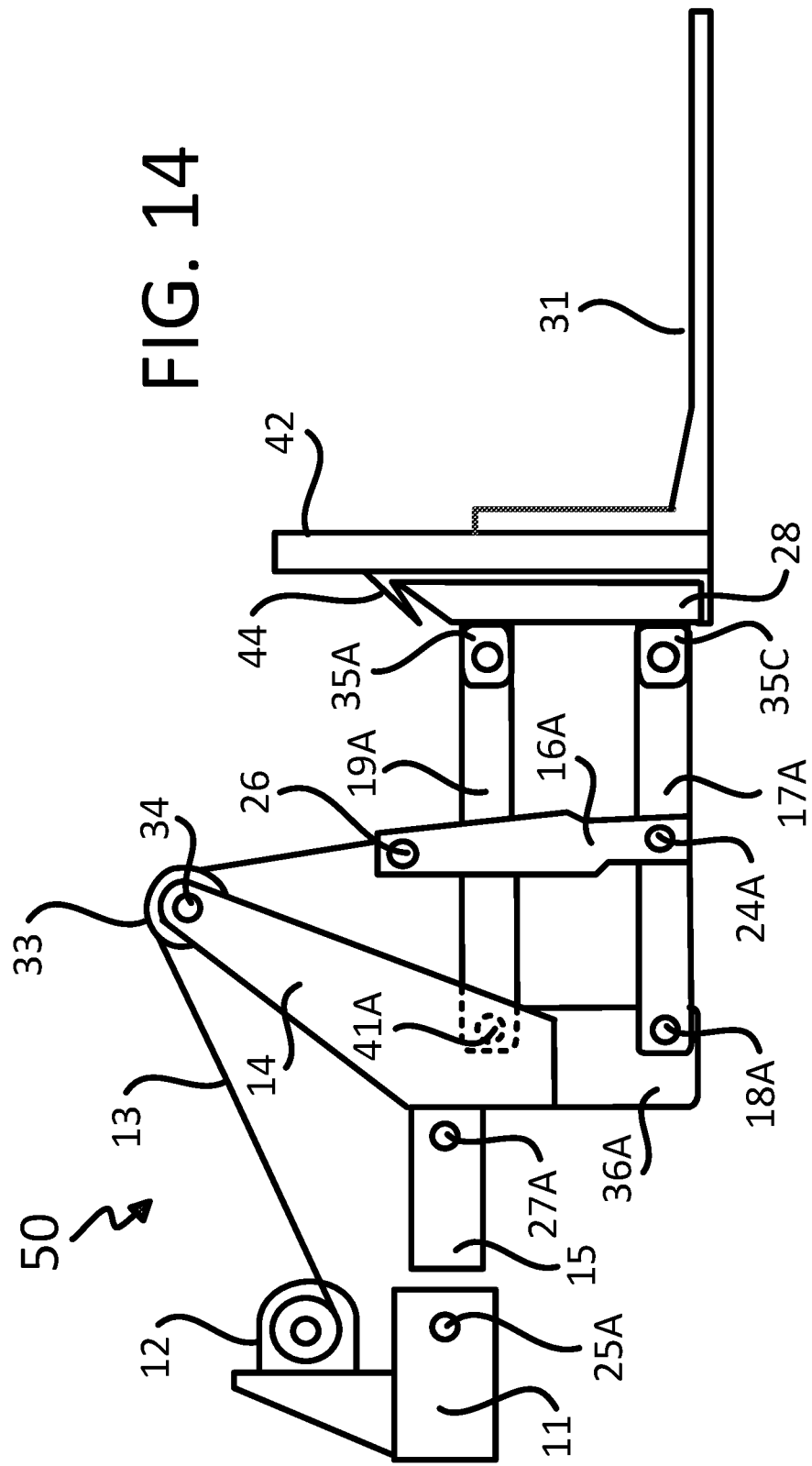
FIG. 14 illustrates the load carrying assembly of the second embodiment combined with the lifting device in a first configuration.

Attachment of the load carrying assembly 20 that does not contain a coupling member to the lifting device 10 is generally suitable for a more permanent attachment to the lifting device 10, while attaching the load carrying assembly 30 to the lifting device 10 using a coupling member is advantageous for frequent attachments to multiple platforms. FIGS. 4-6 portray various views of the coupling member 28 attached to the lifting device 10. It is also noted that the lifting device 10 may contain guard plates 29A and 29B (not shown) that cover the sides of the lifting device support structure 14.

I claim:

1. A lifting device adapted for releasable connection to a powered vehicle equipped with a winch via a receiver tube on the vehicle, comprising a unitary integrated combination of:
    a support structure that includes a vertically extending stanchion with a pulley rotatably mounted proximate an apex of the stanchion;
    a first lower horizontal arm pivotally attached at a first end to the support structure at a first pivot point;
    a second lower horizontal arm pivotally attached at a first end to the support structure at a second pivot point, the second lower horizontal arm being disposed in substantially the same horizontal plane as the first lower horizontal arm;
    a first upper horizontal arm pivotally attached at a first end to the support structure, the first upper horizontal arm being disposed above the first lower horizontal arm;
    a second upper horizontal arm pivotally attached at a first end to the support structure, the second upper horizontal arm being disposed above the second lower horizontal arm and being disposed in substantially the same horizontal plane as the first upper horizontal arm;
    a first fixed-length vertical arm pivotally attached at a first end to about a midpoint of the first lower horizontal arm;
    a second fixed-length vertical arm pivotally attached at a first end to about a midpoint of the second lower horizontal arm;
    a shaft spaced from the pulley and positioned below the pulley and above the first and second upper horizontal arms, and having a first end attached to a second end of the first vertical arm and a second end attached to a second end of the second vertical arm; and
    a coupler tube mateable with the receiver tube,
    wherein (i) the shaft is not attached to the first upper horizontal arm or the second upper horizontal arm, and (ii) neither the first vertical arm nor the second vertical arm is attached to the first upper horizontal arm or the second upper horizontal arm.

2. The lifting device of claim 1 wherein the shaft is operable for engagement by a distal end of a cable supported upon the pulley wherein tensioned pulling of the cable away from the shaft is operable for effecting a lifting of the first and second vertical arms and an upward pivoting of the first and second lower horizontal arms about the first and second pivot points against the force of gravity respectively, and releasing a length of the tensioned cable effects a gravitational lowering of the first and second vertical arms and a gravitational downward pivoting of the first and second lower horizontal arms about the first and second pivot points.

3. The lifting device of claim 1 wherein the first upper horizontal arm and the second upper horizontal arm are extendable and retractable.

4. The lifting device of claim 3 wherein the first lower horizontal arm and the second lower horizontal arm are extendable and retractable.

5. The lifting device of claim 4 wherein the first vertical arm and the second vertical arm are extendable and retractable.

6. The lifting device of claim 5 wherein extendibility and retractability of the horizontal arms and the vertical arms is achieved by an extension member on each arm configured to move a portion of said each arm forward and backward.

7. The lifting device of claim 6 wherein actuating extension and retraction of the horizontal arms is achieved by a loaded spring mechanism, or by a piston powered hydraulically or electrically.

8. The lifting device of claim 3 further comprising a coupling member being attached to a second end of the first upper horizontal arm of the lifting device and to a second end of the second upper horizontal arm of the lifting device, said coupling member also attached to a second end of the first lower horizontal arm of the lifting device and to a second end of the second lower horizontal arm of the lifting device.

9. The lifting device of claim 8 wherein the coupling member contains a first lower extension, a second lower extension, a first upper extension and a second upper extension, the coupling member configured and arranged for attachment to the lifting device by lining up a center hole in the first lower extension of the coupling member with a corresponding hole in the second end of the first lower horizontal arm of the lifting device, lining up a center hole in the second lower extension of the coupling member with a corresponding hole in the second end of the second lower horizontal arm of the lifting device, lining up a center hole in the first upper extension of the coupling member with a corresponding hole in the second end of the first upper horizontal arm of the lifting device, lining up a center hole in the second upper extension of the coupling member with a corresponding hole in the second end of the second upper horizontal arm of the lifting device, inserting a pin through the center hole of each extension and corresponding hole in the corresponding arm with which the center hole of each extension is lined up and attaching a bolt to each pin.

10. The lifting device of claim 8 further comprising a load carrying assembly attached to the coupling member, the load carrying assembly having a horizontal platform, a vertical support member attached to the horizontal platform and a containment member attached to the vertical support member, the coupling member being configured for tightly wedging in the containment member.

11. The lifting device of claim 10 wherein the device is configured and arranged for (i) backward tilting of the load carrying assembly attached to the lifting device via the coupling member by retracting the first and second upper horizontal arms or extending the first and second lower horizontal arms and (ii) a forward tilting of the load carrying assembly attached to the lifting device via the coupling member by extending the first and second upper horizontal arms or by retracting the first and second lower horizontal arms.

12. The lifting device of claim 1 wherein the first end of each horizontal arm is configured and arranged for attachment to the support structure of the lifting device by insertion of a pin through a hole in the first end of each horizontal arm and a hole in a corresponding attachment point in the support structure.

13. The lifting device of claim 1 wherein the first end of each vertical arm is configured and arranged for attachment to a corresponding lower horizontal arm by insertion of a pin through a hole in the first end of each vertical arm and through a hole in a corresponding lower horizontal arm.

14. The lifting device of claim 1 further comprising a load carrying assembly attached to a second end of the first upper horizontal arm of the lifting device and to a second end of the second upper horizontal arm of the lifting device, said load carrying assembly also attached to a second end of the first lower horizontal arm of the lifting device and to a second end of the second lower horizontal arm of the lifting device, the load carrying assembly containing a vertical support and a platform.

15. The lifting device of claim 14 wherein the vertical support of the load carrying assembly contains a first lower extension, a second lower extension, a first upper extension and a second upper extension, with the vertical support of the load carrying assembly attached to the lifting device by a pin inserted through each of (i) a center hole in the first lower extension of the vertical support of the load carrying assembly aligned with a corresponding hole in the second end of the first lower horizontal arm of the lifting device, (ii) a center hole in the second lower extension of the vertical support of the load carrying assembly aligned with a corresponding hole in the second end of the second lower horizontal arm of the lifting device, (iii) a center hole in the first upper extension of the vertical support of the load carrying assembly aligned with a corresponding hole in the second end of the first upper horizontal arm of the lifting device, and (iv) a center hole in the second upper extension of the vertical support of the load carrying assembly aligned with a corresponding hole in the second end of the second upper horizontal arm of the lifting device.

16. A lifting device adapted for releasable connection to a powered vehicle equipped with a winch via a receiver tube on the vehicle, comprising a unitary integrated combination of:
(a) a support structure that includes a stanchion projecting in a first transverse direction with a pulley rotatably mounted proximate an apex of the stanchion;
(b) a pair of laterally spaced lower arms each (i) pivotally attached at a first end to the support structure at first pivot points for pivoting about a first lateral axis, (ii) extending in a first longitudinal direction from the support structure, and (iii) disposed in substantially the same horizontal plane;
(c) a pair of laterally spaced upper arms each pivotally attached at a first end to the support structure at a second pivot point for pivoting about a second lateral axis wherein the second lateral axis is transversely spaced in the first transverse direction from the first lateral axis;
(d) a laterally extending yoke (i) conjoining the pair of lower arms, (ii) transversely positioned in a second transverse direction opposite the first transverse direction from the pulley, and (iii) operable for effecting joint pivoting of the pair of lower arms about the first pivot points when the yoke is transversely displaced without concomitant pivoting of the pair of laterally spaced upper arms about the second pivot point; and
(e) a coupler tube adapted for coupling with the receiver tube and extending in a second longitudinal direction opposite the first longitudinal direction from the support structure.

17. The lifting device of claim 16 wherein the pair of laterally spaced upper arms is extendable and retractable.

18. The lifting device of claim 16 further comprising a load carrying assembly, the load carrying assembly including at least a vertical support and a platform, with the load carrying assembly attached to a second end of each of the pair of lower arms and a second end of each one of the pair of laterally spaced upper arms.

* * * * *